United States Patent [19]

Marlatt

[11] 4,371,495
[45] Feb. 1, 1983

[54] SELF RUPTURING GAS MODERATOR ROD FOR A NUCLEAR REACTOR

[75] Inventor: George R. Marlatt, Monroeville, Pa.

[73] Assignee: Westinghouse Electric Corp., Pittsburgh, Pa.

[21] Appl. No.: 228,007

[22] Filed: Jan. 23, 1981

[51] Int. Cl.³ .............................................. G21C 7/26
[52] U.S. Cl. .................................... 376/209; 376/221; 376/336; 376/447
[58] Field of Search ............... 376/327, 328, 331, 336, 376/447, 337, 220, 221, 332, 435, 209

[56] References Cited

U.S. PATENT DOCUMENTS

| | | | |
|---|---|---|---|
| 3,212,984 | 10/1965 | Tollet et al. | 376/209 |
| 3,361,636 | 1/1968 | Bagge | 376/209 |
| 3,671,393 | 6/1972 | Williams | 376/420 |
| 3,745,069 | 7/1973 | Sofer et al. | 376/327 |

FOREIGN PATENT DOCUMENTS 1204346 11/1965 Fed. Rep. of Germany ...... 376/336

Primary Examiner—Harvey E. Behrend
Attorney, Agent, or Firm—Z. L. Dermer

[57] ABSTRACT

An arrangement for controlling the moderation of a nuclear reactor which includes multiple fuel assemblies each of which includes top and bottom nozzles with fuel rods and control rod guide thimbles located therebetween. Certain ones of said assemblies include at least one tube initially filled with a gas. One end of the tube rests on the lower nozzle upper surface while the upper end terminates at a point just below the lower plate in the upper nozzle. A spike immovably fixed in the lower plate of the upper nozzle is directed downwardly toward the end of the tube. As the tube expands or grows during operation in a reactor, and at a point where the criticality factor may proceed to less than one, the expanded tube will be pierced by the spike and thus permit the escape of gas from the tube which is then replaced by water coolant circulating through the reactor. The additional water represented by the filled tube will act to slow down fast neutrons to a thermal neutron level and thus provide a greater amount of neutron effective in carrying forward the fissioning process.

4 Claims, 2 Drawing Figures

SELF RUPTURING GAS MODERATOR ROD FOR A NUCLEAR REACTOR

BACKGROUND OF THE INVENTION

The invention described herein relates to nuclear reactors and more particularly to apparatus for controlling the reactivity during operations.

Conventional commercial nuclear power reactors contain fuel in a sufficient size and configuration which enables the reactor to continuously sustain a fission-type chain reaction. Initially, at start up, the amount of fuel in the reactor core is always greater than that needed for the chain reaction in order to obtain operation over a long time period and to compensate for fissile material burn-up and the generation of reaction products resulting from the fission process. Since the excess fuel produces more neutrons than needed to sustain the chain reaction, the excess neutrons must be controlled to maintain operation at a criticality point and thereby prevent the reactor from reaching an uncontrolled condition. conventionally, such control is primarily accomplished by absorbing neutrons in non-fissioning material and permitting the escape of others from the reactor. Axially movable control rods absorb neutrons and although the control rods may perform separate control shimming and safety functions, stationary rods of neutron absorbing material also may be utilized for absorbing the excess neutrons. Liquid moderating coolants such as water, or water containing boron, for example, also are used to assure reactor operation within prescribed ranges and under certain control conditions.

Neutrons generated by fission move at high velocities and therefore at different energy levels and fission in the reactor is primarily caused by neutron possessing thermal energies, i.e., neutrons at or near thermal equilibrium with the surrounding medium. Since light water reactors depend on thermal neutrons to produce the major portion of their fissions, it is important to moderate fast neutrons to bring them to engery levels more acceptable to the fissioning process. In a light water reactor, moderation is accomplished by utilizing ordinary water, circulating through the reactor core. At the beginning of life, at start-up when excess neutrons are thus generated, the moderating capabilities of the reactor can be lessened and this action will cause fewer neutrons born in fission to reach thermal energy. The neutrons which do not reach thermal energy are utilized to convert fissionable U238 to fissile Pu239. As the fissile material decreases during extended reactor operation, the amount of moderation can be increased to provide additional slowing of the neutrons and still sustain the required reactivity level. However, the apparatus and material needed to carry out changes in reactor moderation is costly, even it may provide a uniform or gradual change in the moderating material.

SUMMARY OF THE INVENTION

Briefly stated, in accordance with one aspect of the invention, gas-filled rods are incorporated in appropriate assemblies in the reactor so that at the beginning of core life, the moderation is at a low level. As reactor operations proceeds, the gas-filled zirconium rods will increase in length and engage a spike on the bottom side of the top nozzle which pierces the upper end plug and permits the rod to fill with water. Since the water is of a different density than the gas, the moderation will increase thus permitting the use of a lower level of fuel enrichment for the same burn-up as reactors which utilize boron, for example, in the coolant for absorption purposes.

BRIEF DESCRIPTION OF THE DRAWINGS

While the foregoing discussion identifies problems presently existing in the prior art together with a general description of how they may be overcome, it is believed the following disclosure of the preferred embodiment of the invention will be better understood by reference to the accompanying drawings wherein.

Figure 1:
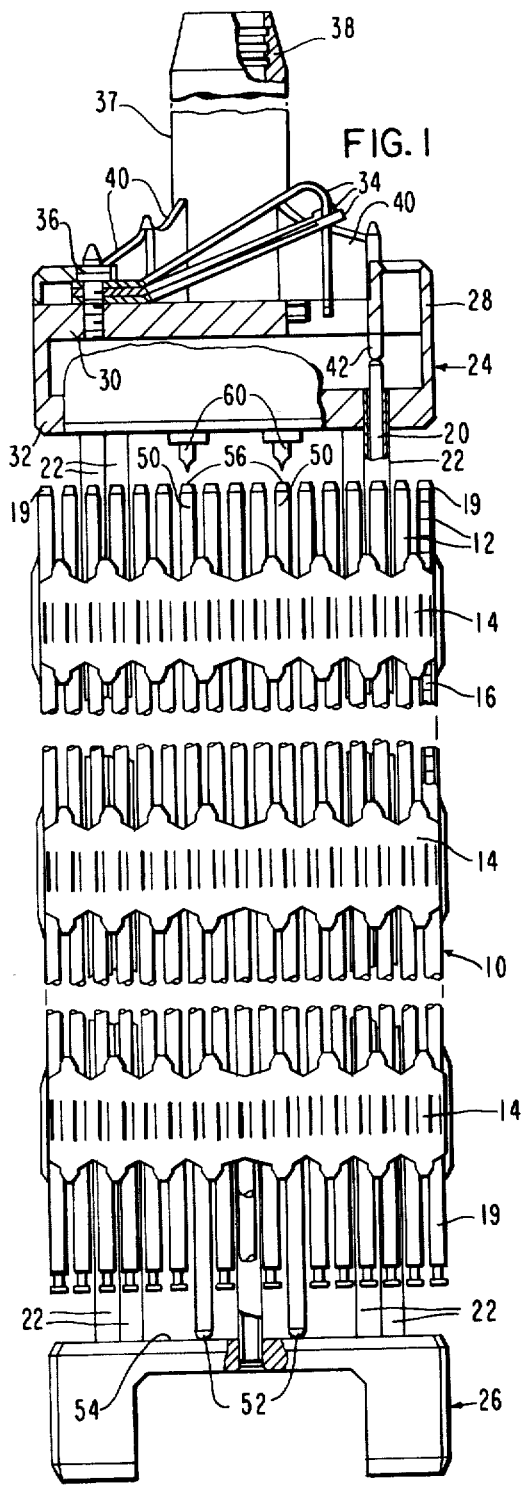
FIG. 1 is a view in elevation, partly in section, illustrating the design of a fuel assembly which incorporates features arranged to permit separate gas-filled rods to be pierced by a spear during reactor operation.

Referring now to the drawings wherein like reference characters designate like or corresponding parts throughout the several views, there is shown in FIG. 1 a nuclear reactor fuel assembly including an array of fuel rods 12 held in spaced relationship with each other by grids 14 spaced along the fuel assembly length. Each fuel rod includes nuclear fuel pellets 16 and the ends of the rods are closed by end plugs 19, all in a conventional manner.

To control the fission process, a multiplicity of control rods 20 are reciprocally movable in control rod guide tubes or thimbles 22 located at predetermined positions in each selected fuel assembly in the reactor. The reactor includes a top nozzle 24 and a bottom nozzle 26 to which opposite ends of the control rod guide thimbles 22 are attached to form an integral assembly capable of being conveniently handled without damaging the assembly components.

As illustrated in FIG. 1, the nozzles are square in cross-section and the top nozzle comprises a housing 28 having an upper plate 30 spaced from an adapter plate 32. Assembly hold-down springs 34 attached to opposite sides of upper plate 30 are held in place by bolts 36 and are adapted to be compressed when the reactor upper core plate (not shown) is placed in position. The top nozzle further includes a rod cluster control assembly 37 comprising an internally threaded cylindrical member 38 having radially extending flukes or arms 40. A connector interconnects each control rod 20 with the arms, the arrangement being such that the rod cluster assembly moves the control rods vertically in the control rod guide thimbles to thereby control the fission process in the assembly, all in a well-known manner.

Figure 2:
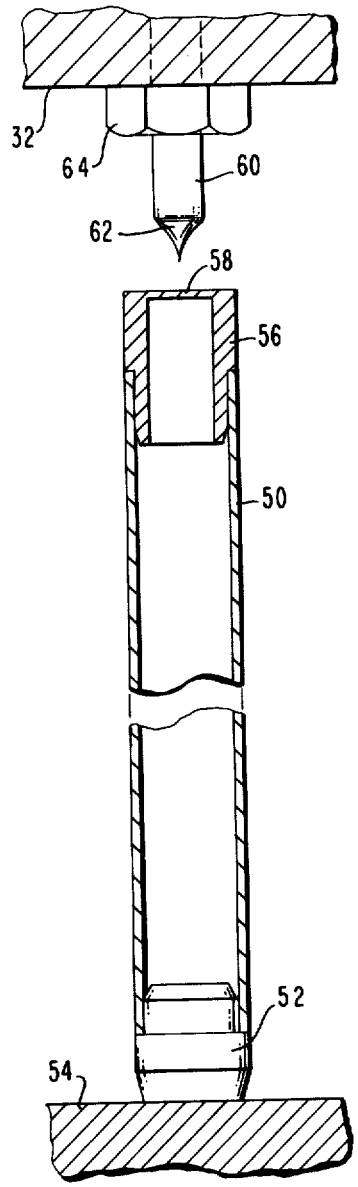
FIG. 2 is an enlarged detailed view of the spear-rod arrangement as shown in FIG. 1.

As indicated above, because of the excess fuel initially provided in the reactor core, surplus neutrons are both absorbed and allowed to escape from the core. In lieu of using a moderator in the core of a type which completely absorbs neutrons, such as boron, in the water coolant, and precludes them from causing fission in the fuel, this invention utilizes multiple tubes in the fuel assembly for moderation purposes. The tubes 50 which extend the length of the core are made of zircaloy and include a bottom end plug 52 welded or otherwise fixed in the zircaloy material. Unlike fuel rods which do not contact the bottom nozzle, tubes 50 contact the nozzle upper surface 54 and it thereby constitutes a stop against which the tube may bear while undergoing longitudinal expansion As shown in FIG. 2, the upper end plug 56 is of hollow design and at its top end includes a thin wall section 58 positioned immediately below a sharp pointed spike 60. The spike includes longitudinal grooves 62 and is anchored in the top nozzle plate by a nut 64 or by any other conventional fastening arrangement.

When the tube 50 is being assembled, it is charged with helium or other gas to a pressure about the same as the fuel rods. Since it will have a density less than the liquid medium which it displaces, less moderation will be available at the beginning of life than with a system which utilizes boron or other neutron absoring material in the coolant. Therefore, with the same number of fissions occurring, i.e., at the same power level, essentially the same quantity of thermal flux will be produced as in a boron system but a higher quantity of fast neutrons. Since the excess neutrons are not captured by boron, they are at least partially absorbed in U238 in the fuel to produce Pu239 which is fissile. As the reactor criticality approaches the point where the thermal neutrons generated begin to become less than those being absorbed and escaping from the core, the tube 50 will have grown by expansion to the point where it is pierced by spike 60. Gas initially charged in the tube will escape through grooves 62 and water coolant accordingly will displace the gas in the rod as it fills with water. The additional moderation thus provided by the water will slow down fast neutrons to the thermal neutron speed range and thus have the effect of producing more thermal neutrons. Therefore as fuel burn-up progresses, the amount of moderation is increased by the additional water to provide the additional neutrons to sustain the reaction.

The advantages gained from this design is that the fuel is utilized to a greater degree, and since less moderation is required, a smaller pitch/diameter ratio of fuel rods may be used, or larger fuel rods may be used for a given fuel rod array in an assembly, the result being that more acceptable heat fluxes will be available.

It will be apparent the many modifications and variations are possible in light of the above teachings. It therefore is to be understood that within the scope of the dependent claims the invention may be practiced other than as specifically described.

I claim:

1. A nuclear reactor comprising:
   a plurality of fuel assemblies, each of said assemblies having top and bottom nozzles with fuel rods and control rod guide tubes interposed therebetween;
   at least one gas-filled tube in a portion of said assemblies, said tube extending substantially the full length of said assembly having its bottom end resting on the upper surface of said lower nozzle;
   a spike immovably mounted in the lower plate of the top nozzle and having its point directed downwardly toward the top of said gas-filled tube, the point on said spike and top of said rod being spaced a distance equal to the amount the rod will expand during operation in a reactor, minus a distance sufficient for the spike to pierce the top of said tube and permit the gas therein to be displaced by water coolant circulating through the reactor.

2. The combination according to claim 1 wherein said rod is initially charged with a gas sufficient to prevent collapse thereof when exposed to the coolant pressure in the reactor.

3. The combination according to claim 1 wherein said plug in the top of gas-filled tube has an upper section sufficiently thin to be pierced by the spike as the rod expands in length.

4. The combination according to claim 1 wherein said spike has longitudinal grooves extending from approximately the tip of the point to where the full diameter of the spike commences to permit the escape of gas and ingressive coolant into the tube when it is pierced by said spike.

* * * * *